(No Model.)
H. A. SEYMOUR.
CLOSED CONDUIT FOR ELECTRIC RAILWAYS.
No. 514,134. Patented Feb. 6, 1894.
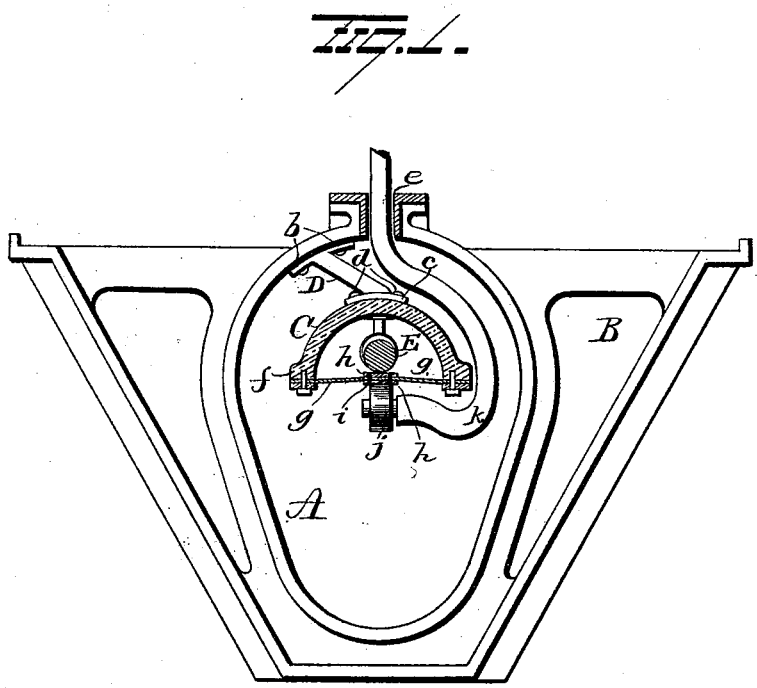
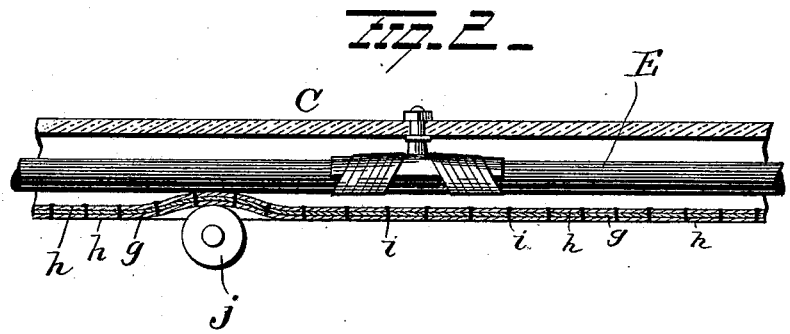
Witnesses:
R. A. Nottingham
G. F. Downing
Inventor
Henry A. Seymour
By H. A. Seymour
Attorney

UNITED STATES PATENT OFFICE.

HENRY A. SEYMOUR, OF WASHINGTON, DISTRICT OF COLUMBIA, ASSIGNOR TO THE SHORT ELECTRIC RAILWAY COMPANY, OF CLEVELAND, OHIO.

CLOSED CONDUIT FOR ELECTRIC RAILWAYS.

SPECIFICATION forming part of Letters Patent No. 514,134, dated February 6, 1894.

Application filed August 29, 1892. Serial No. 444,439. (No model.)

*To all whom it may concern:*

Be it known that I, HENRY A. SEYMOUR, of Washington, in the District of Columbia, have invented certain new and useful Improvements in Underground Electric Conductors for Electric Railroads, and I do hereby declare the following to be a full, clear, and exact description of the invention, such as will enable others skilled in the art to which it appertains to make and use the same.

My invention relates to an improvement in underground electric conductors for electric railroads,—the object being to so arrange the main conductor within the conduit, that it shall be thoroughly insulated at all points.

A further object is to provide an insulating envelope for an underground electric railway system, so arranged that said conductor shall, at all times and at all points throughout its length, be completely surrounded by insulating material, and to so construct said envelope that all moisture, dirt, &c., shall be effectually excluded from the conductor, and be prevented from remaining on the envelope.

A further object is to construct and arrange an underground electric conductor in such manner that it shall be completely and effectually insulated, and whereby the trolley shoe or wheel may be brought into electrical communication from beneath the conductor, so that the parts will be prevented from injurious conflict with objects passing over the mouth of the conduit or by anything which might fall through the opening in the conduit.

With these objects in view the invention consists in certain novel features of construction and combinations and arrangements of parts as hereinafter set forth and pointed out in the claims.

In the accompanying drawings: Figure 1 represents a cross section of a conduit having my improvements arranged therein. Fig. 2 is a longitudinal sectional view.

A represents a conduit and B a yoke such as is commonly employed for assisting in the proper maintenance of the conduit.

Located within the conduit A, is an insulated shell C, preferably of porcelain, which is supported within the conduit by means of a series of brackets D. The brackets D are provided with perforated ears $b$ whereby to secure said brackets to the yokes B. At the other end each bracket is made with arms $c$ properly shaped to lie against the shells C and partially embrace the same, said arms $c$ being secured to the shell by means of bolts $d$. The shell C is preferably made semicircular in cross section so that its top will present a curved surface. By thus constructing the insulating shell, any water, dirt or other matter which might find its way through the slot or opening $e$ in the conduit, will be prevented from lodging on the shell but will fall therefrom, and the shell will therefore be kept clean and dry at all times. The shell C is disposed in the conduit with its open end downwardly. The edges of the shell C are provided with flanges $f$ to which the edges of a flexible diaphragm $g$ of non-conducting material are secured, said diaphragm being thus adapted to close the shell. Placed against the inner and outer faces of the diaphragm $g$ are thin metallic plates $h$ secured together and to the diaphragm by means of a series of pins or rivets $i$. A trolley shoe or roller $j$ is carried by a bent arm $k$ depending from a car, said trolley shoe or roller being adapted to run on the outer contact plate $h$ and force the inner plate $h$ on the diaphragm, against a conductor E supported within the shell.

Having fully described my invention, what I claim as new, and desire to secure by Letters Patent, is—

1. The combination with an inverted rigid shell and an electric conductor secured to its under side, of an electric conducting diaphragm secured to the depending edges of the shell, and retained out of contact with the conductor by its gravity, and adapted to be forced upwardly into contact therewith by an under running trolley, substantially as set forth.

2. The combination with an inverted rigid shell and an electric conductor secured to its under side, of an electric conducting medium located beneath the shell and normally out of contact with the conductor secured therein, and adapted to be lifted into contact therewith by an under running trolley, substantially as set forth.

3. The combination with an inverted rigid shell of insulating material and an electric conductor secured to its under side and insulated therefrom, of a yielding medium secured to the depending edges of the shell, an electric conductor secured to said yielding medium and an under running trolley, substantially as set forth.

4. The combination with an inverted rigid shell and an electric conductor secured to its under side, of a flexible water-tight diaphragm secured to the under side of the shell, and electric conducting contacts attached to said diaphragm, substantially as set forth.

5. The combination with an electric conductor, of a shell or envelope of non-conducting material inclosing said conductor, said shell or envelope having an opening in its under side, a diaphragm of insulating material closing said opening, contacts located on both faces of said diaphragm and electrically connected with each other, an arm bent to extend beneath said shell or envelope and a trolley roller or shoe carried by said arm and adapted to run on the contact on the under side of the diaphragm, substantially as set forth.

6. The combination with a conduit, an inverted rigid shell located within the conduit and beneath the slot therein, of an electric conductor secured within the shell, a flexible diaphragm attached to the depending edges of the shell, electrical contacts fastened to the diaphragm, and an under running trolley for lifting the electrical contacts into engagement with the conductor within the shell, substantially as set forth.

In testimony whereof I have signed this specification in the presence of two subscribing witnesses.

HENRY A. SEYMOUR.

Witnesses:
C. S. DRURY,
R. S. FERGUSON.